(12) United States Patent
Karr et al.

(10) Patent No.: US 6,650,519 B1
(45) Date of Patent: Nov. 18, 2003

(54) ESD PROTECTION BY A HIGH-TO-LOW RESISTANCE SHUNT

(75) Inventors: Brian William Karr, Savage, MN (US); Lance Eugene Stover, Eden Prairie, MN (US); Michael Berry Hintz, Mathomed, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 496 days.

(21) Appl. No.: 09/641,144

(22) Filed: Aug. 17, 2000

Related U.S. Application Data
(60) Provisional application No. 60/149,519, filed on Aug. 17, 1999.

(51) Int. Cl.[7] .................................................. H02H 9/00
(52) U.S. Cl. ......................... 361/58; 361/103; 361/115
(58) Field of Search ........................... 361/56, 58, 103, 361/106, 115, 111, 118, 119

(56) References Cited

U.S. PATENT DOCUMENTS

| | | | |
|---|---|---|---|
| 3,619,725 A | 11/1971 | Soden et al. ............. 317/101 A |
| 3,740,523 A | 6/1973 | Cohen et al. ........ 219/121 LM |
| 4,055,847 A | 10/1977 | Fletcher et al. ................. 357/5 |
| 4,476,375 A | 10/1984 | Ogawa .................... 217/121 N |
| 5,185,291 A | 2/1993 | Fischer et al. ............... 437/173 |
| 5,465,186 A | 11/1995 | Bajorek et al. ............. 360/113 |
| 5,699,212 A | 12/1997 | Erpelding et al. ........... 360/104 |
| 5,748,412 A | 5/1998 | Murdock et al. ............ 360/113 |
| 5,759,428 A | 6/1998 | Balamane et al. ...... 219/121.66 |
| 5,789,794 A | 8/1998 | Froehner ..................... 257/529 |
| 5,827,759 A | 10/1998 | Froehner ..................... 438/132 |
| 5,933,714 A | 8/1999 | Froehner ..................... 438/132 |
| 5,936,296 A | 8/1999 | Park et al. ................... 257/529 |

OTHER PUBLICATIONS

"Binary Alloy Phase Diagrams: Second Edition", *ASM International*, vol. 1, pp. 435–436 (Dec. 1990).
Frank, W. et al., "Diffusion Of Gold And Platinum In Amorphous Silicon And Germanium", *Journal of Non–Crystalline Solids*, vol. 205–207, pp. 208–211 (1996).
Wolffenbuttel, R., "Low–Temperature Intermediate Au–Si Wafer Bonding; Eutectic Or Silicide Bond", *Sensors And Actuators A Physical*, vol. A62, No. 1–3, pp. 680–686 (1997).

*Primary Examiner*—Stephen W. Jackson
(74) *Attorney, Agent, or Firm*—Merchant & Gould P.C.

(57) ABSTRACT

A method and apparatus for protecting a thin film sensor such as a magnetoresistive head from damaging electrical transients, such as electrostatic discharge. A thin film sensor assembly includes a thin film sensor in electrical contact with a first and a second electrical contact. A shunting structure is deposited between and in electrical communication with the first and second electrical contacts such that the shunting structure as deposited is a high resistance path between the first and second electrical contacts and does not electrically short the first and second electrical contacts. Heat treating the shunting structure then forms a low resistance path between the first and second electrical contacts to provide protection of the sensor from electrostatic discharge.

20 Claims, 6 Drawing Sheets

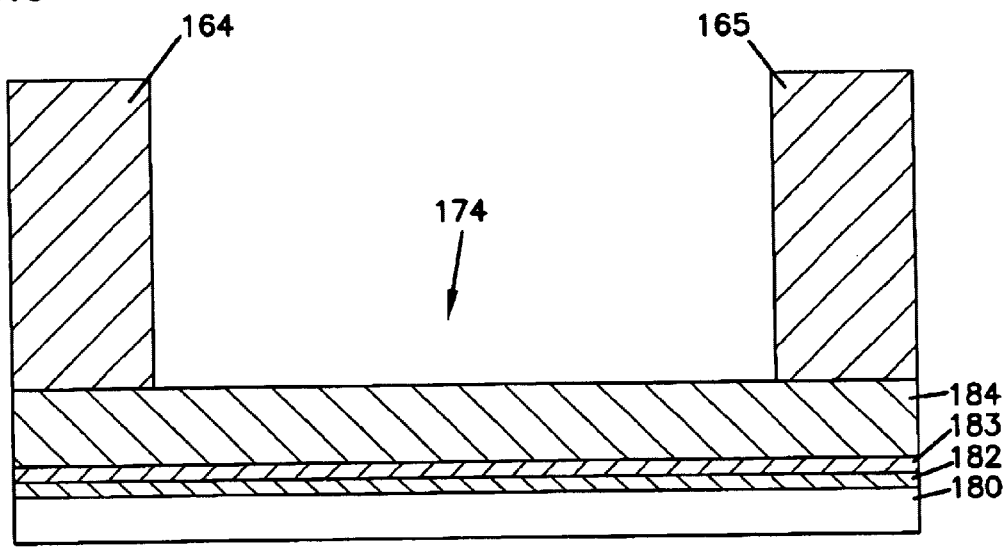
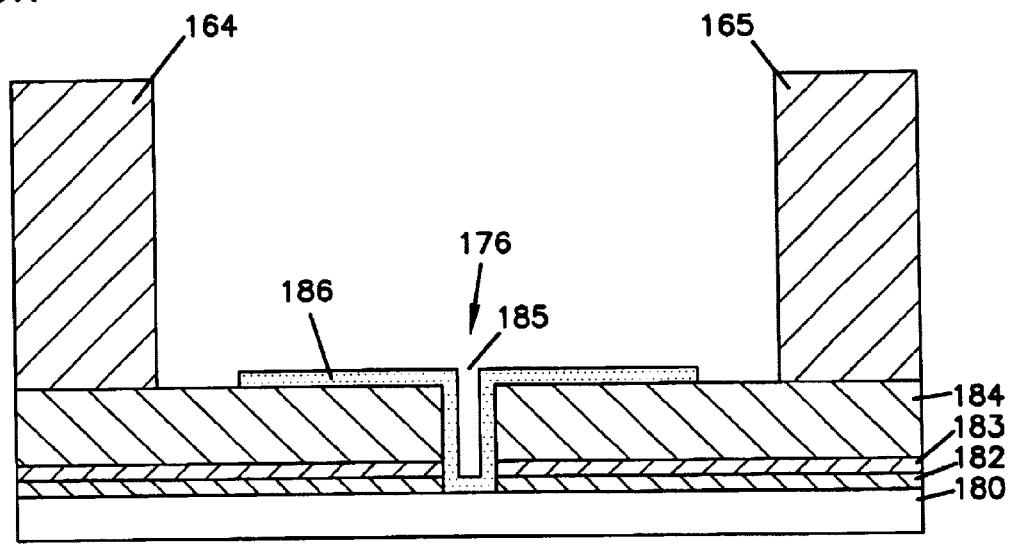

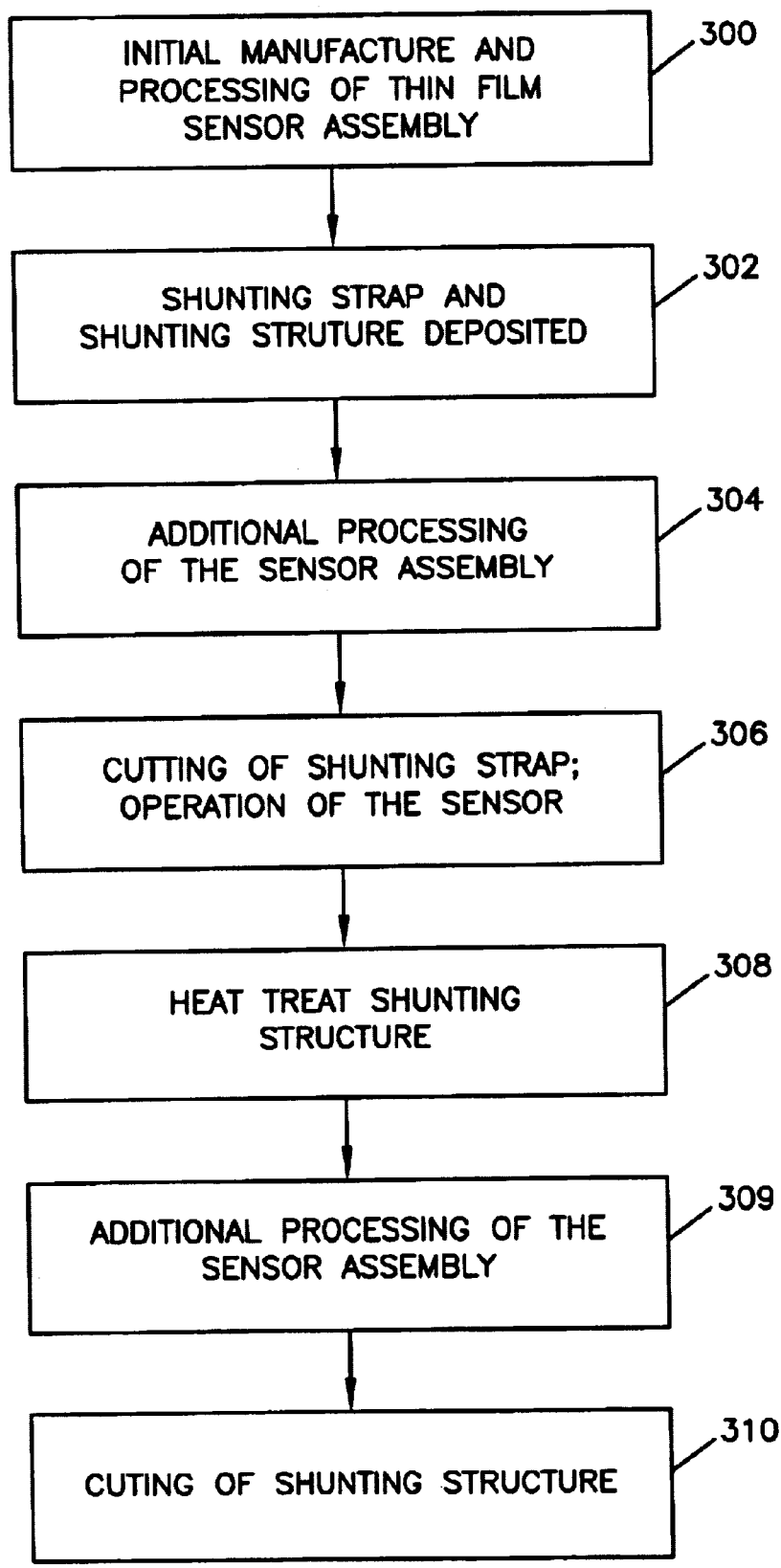

ESD PROTECTION BY A HIGH-TO-LOW RESISTANCE SHUNT

RELATED APPLICATIONS

This application claims the priority of U.S. Provisional Patent Application Ser. No. 60/149,519 entitled "ESD PROTECTION BY A HIGH-TO-LOW RESISTANCE THIN FILM SHUNT" filed Aug. 17, 1999.

FIELD OF THE INVENTION

This application relates to magnetic disc drives and more particularly to the protection of thin film sensors, such as magnetoresistive head structures, from damage caused by damaging electrical transients, such as electrostatic discharge.

BACKGROUND OF THE INVENTION

Disc drives are data storage devices that store digital data in magnetic form on a storage medium on a rotating information storage disc. Modern disc drives include one or more rigid discs that are coated with a medium that can be magnetized. These discs are mounted on the hub of a spindle motor for rotation at a constant high speed. Information is stored on the discs in a plurality of concentric circular tracks. Each of the concentric tracks is generally divided into a plurality of separately addressable data sectors. The read/write transducer, e.g., a magnetoresistive read/write head, is used to transfer data between a desired track and an external environment. During a write operation, data is written onto the disc track and during a read operation the head senses the data previously written on the disc track and transfers the information to the external environment. Critical to both of these operations is the accurate locating of the head over the center of the desired track, by a function referred to as servoing.

The heads are mounted via a suspension on flexures at the ends of actuator arms that project radially outward from the actuator body. The actuator body pivots about a shaft mounted to the disc drive housing at a position closely adjacent the outer extreme of the discs. The pivot shaft is parallel with the axis of rotation of the spindle motor and the discs, so that the heads move in a plane parallel with the surfaces of the discs.

Trends in the disc drive industry have required disc drive manufacturers to provide drives with increased areal densities. In order to meet this growing demand, much advancement in read/write head technology have been implemented. One such advancement was moving from an inductive head design to a magnetoresistive (MR) head structure due to the many advantages a MR head offers.

Although there are many benefits with MR technology, there is a distinct problem associated with the improved sensitivity. An MR head is 100 times more sensitive to electrostatic discharge (ESD) than the older inductive heads. Furthermore, since their introduction, MR head structures have shrunk in order to meet growing areal density demands, making the MR heads even more sensitive to ESD. The latest MR head technology, called GMR (Giant Magnetoresistive), is sensitive to ESD levels as low as 3 volts, and below.

ESD is an uncontrolled static charge transfer from one object to another. In MR heads, ESD occurs when there is a buildup of charge on various elements of the head or other elements in the read/write assembly that are in electrical contact with the MR element of the head, and the head is momentarily shorted to ground. The charge runs through the MR element into ground, thus creating an ESD pulse that is potentially damaging for the MR element.

ESD is only a minor concern in a completed, and operational disk drive. Once in a completed disc drive, the MR elements on the heads are typically protected. The drive case shields the heads from particulate contamination, human contact and other adverse elements that could cause an ESD event.

However, ESD presents a major problem during manufacture, installation and handling of the head and drive, because drive-level ESD protective measures are not yet in place. Therefore, ESD from human or equipment contact and electric fields can cause damage to the MR structures in the head, thereby reducing effect yield and raising costs.

Because of this constant potential damage to the MR head from ESD during manufacturing and handling, it is desirable to protect the MR head from ESD damage. One such method of MR head protection is by shorting together some or all of the electrical circuitry that connects to the MR head, a process generally known as shunting. By shorting the circuitry leading to the MR head, a low resistance path to ground exists. Therefore, the ESD pulse is directed through the short and bypasses the MR structure, thereby protecting the head.

However, when the MR head is required to function, for example during testing of the head, the electrical shunt will also short out any electrical input to or output from the head. Therefore, the shunt must be removed from the head during electrical testing. After testing is complete, there is often additional processing and handling that must occur prior to final installation. As such, with the shunt removed for testing, the head is again vulnerable to damage from ESD during these additional processing and handling steps. Therefore, it is desirable to reinstall a shunt, or "re-shunt" the MR circuit after testing. Many shunting methods and devices do not allow for the easy re-shunting of the head after testing.

Therefore, there is a need in the relevant art to overcome the shortcomings of the traditional ESD protection mechanisms.

SUMMARY OF THE INVENTION

Against this backdrop, the invention has been developed. The invention includes an apparatus and method for shunting a thin film sensor, for example, shunting an MR head.

In accordance with one preferred embodiment, the invention is implemented as a method for protecting a thin film sensor such as a magnetoresistive element from damaging electrical transients, such as electrostatic discharge. The method includes providing a thin film sensor assembly such as a magnetoresistive head including the sensor in electrical contact with a first and a second electrical contacts. A shunting structure is deposited between and in electrical communication with the first and second electrical contacts such that the shunting structure as deposited is a high resistance path between the first and second electrical contacts and does not electrically short the first and second electrical contacts. Heat treating the shunting structure then forms a low resistance path between the first and second electrical contacts to provide protection of the thin film sensor assembly from damaging electrical transients.

The invention can be implemented in accordance with another preferred embodiment as an assembly for providing electrical protection to a thin film sensor such as a magnetoresistive element. The assembly includes a thin film sensor assembly including the thin film sensor, and first and second electrical contacts in electrical communication with the sensor. The assembly further includes a shunting structure deposited between and in electrical communication with the first and second electrical contacts. The shunting structure as initially deposited is a high resistance path between the first and second electrical contacts and does not electrically short the first and second electrical contacts. When the shunting structure is heat treated, the shunting structure thereafter becomes a low resistance path between the first and second electrical contacts to provide protection of the thin film sensor assembly from damaging electrical transients.

These and various other features as well as advantages which characterize the present invention will be apparent from a reading of the following detailed description and a review of the associated drawings.

BRIEF DESCRIPTION OF THE DRAWINGS

FIG. 6 is a sectional schematic of the shunting strap taken along lines 6—6 of FIG. 5.

FIG. 7 is a sectional schematic of the shunting structure along lines 7—7 of FIG. 5.

FIG. 10 is a flow diagram of method of processing a sensor assembly using a shunting strap and shunting structure.

DETAILED DESCRIPTION

The invention provides electrical protection for thin film sensors against damaging electrical transients by shorting or "shunting" some or all of the electrical circuitry to a sensor assembly incorporating the sensor, or in some instances, re-shunting apparatus and method. It should be understood that as used herein, the term damaging electrical transients is intended to include ESD, electrical spikes, electrical noise, or generally any undesired electrical signal. One example of a thin film sensor in a thin film sensor assembly which can be protected using the invention described herein is an MR element in an MR head.

It should be understood that as used herein, the terms "magnetoresistive" or "magnetoresistive elements" are intended to include all types of magnetoresistive elements, including both magnetoresistive ("MR") and giant magnetoresistive ("GMR") elements. Additionally, the term "MR head" typically denotes an integrated unit that includes an MR read element. Preferably, the element also includes an inductive write element, but this is not necessary. Furthermore, the ESD protection features of the invention may be applied to actuator assemblies including other types of recording heads, such as non-MR heads.

A shunting or re-shunting method and apparatus embodying the invention is typically used during the production, processing, and handling of an MR head that is used in a disc drive, a media testing device, or other such devices.

Figure 1:
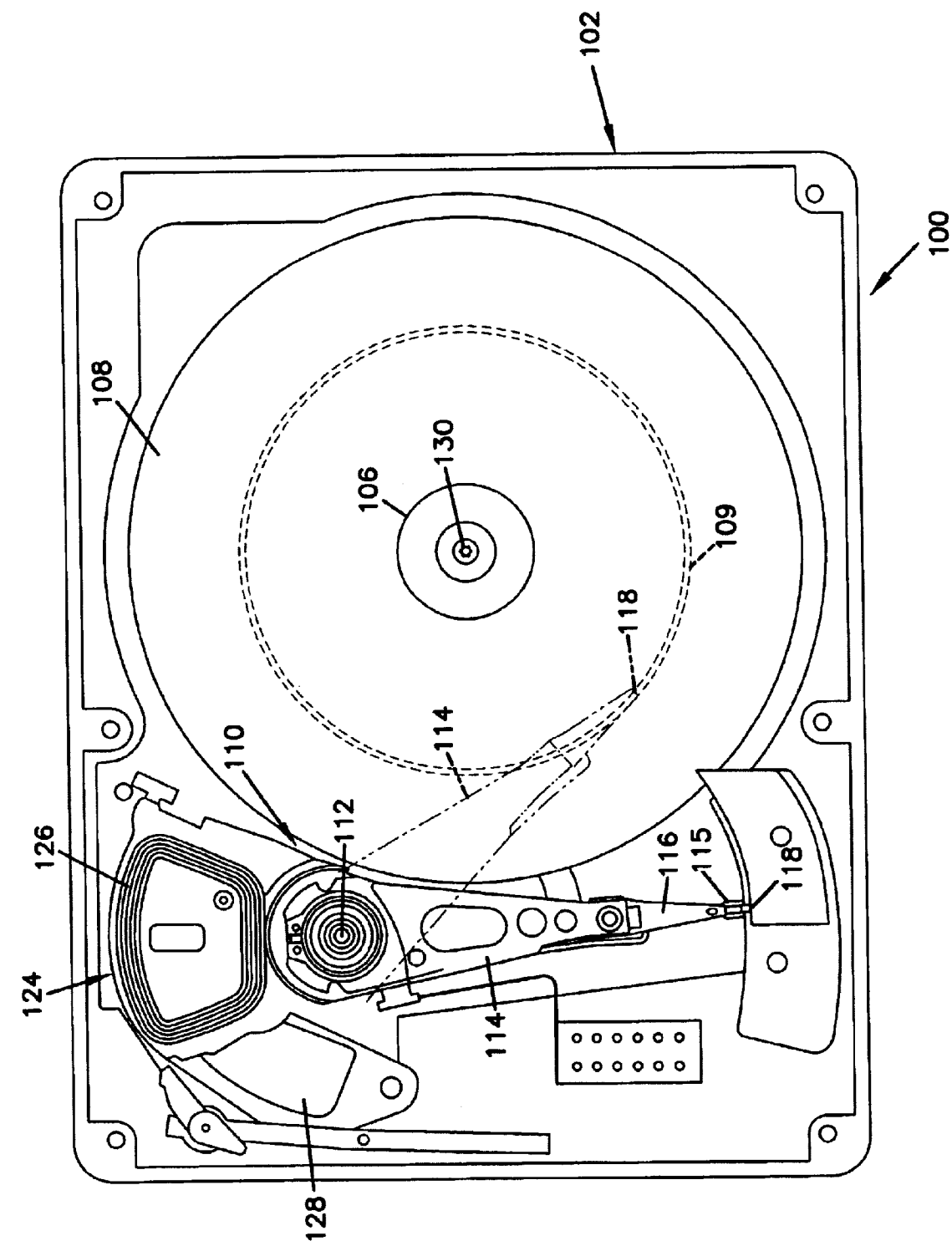
FIG. 1 is a top plan schematic of a disc drive, with its top cover removed, incorporating a shunting assembly in accordance with a preferred embodiment of the present invention.

As environment, a typical disc drive 100 is shown in FIG. 1. The disc drive 100 includes a base plate 102 to which various components of the disc drive 100 are mounted. A top cover (not shown) cooperates with the base 102 to form an internal, sealed environment for the disc drive 100 in a conventional manner. The components include a disc drive motor 106 that rotates one or more information storage discs 108 at a constant high speed. The disc drive spindle motor 106 rotates the spindle 130 which carries the one or more information storage discs 108. The spindle 130, and therefore the one or more information storage discs 108, are rotated about the spindle axis of rotation by the spindle motor 106, as is generally known in the art.

Information is written to and read from tracks 109 on the discs 108 through the use of an actuator assembly 110 which rotates about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a suspension 115 and a head 118 mounted on the suspension that includes an air bearing slider enabling the head 118 to fly in close proximity above the corresponding surface of the associated information storage disc 108.

The radial position of the heads 118 is controlled through the use of a voice coil motor (VCM) 124, which typically includes a coil 126 attached to the actuator assembly 110, as well as one or more permanent magnets 128 that establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112 and the heads 118 are caused to move across the surfaces of the discs 108.

It will be understood by those of skill in the art that the invention relates to an electrical protection shunting or re-shunting apparatus and method that is used primarily during the construction, handling, and installation of an actuator assembly 110 including a thin film sensor such as the MR head 118 to protect the head from damage due to electrical transients such as ESD. The above description of a disc drive 100 incorporating such an actuator assembly 110 is provided for environment. It should be understood that the invention is in no way limited to protection of heads 118 on actuator assemblies 110 that are for use only in a disc drive. Heads 118 incorporating the shunting apparatus and method of the invention are often used in other applications, such as media testing devices, and other such applications. Generally, the invention can be used to protect a thin film sensor, or a thin film sensor within an apparatus or assembly.

Figure 2:
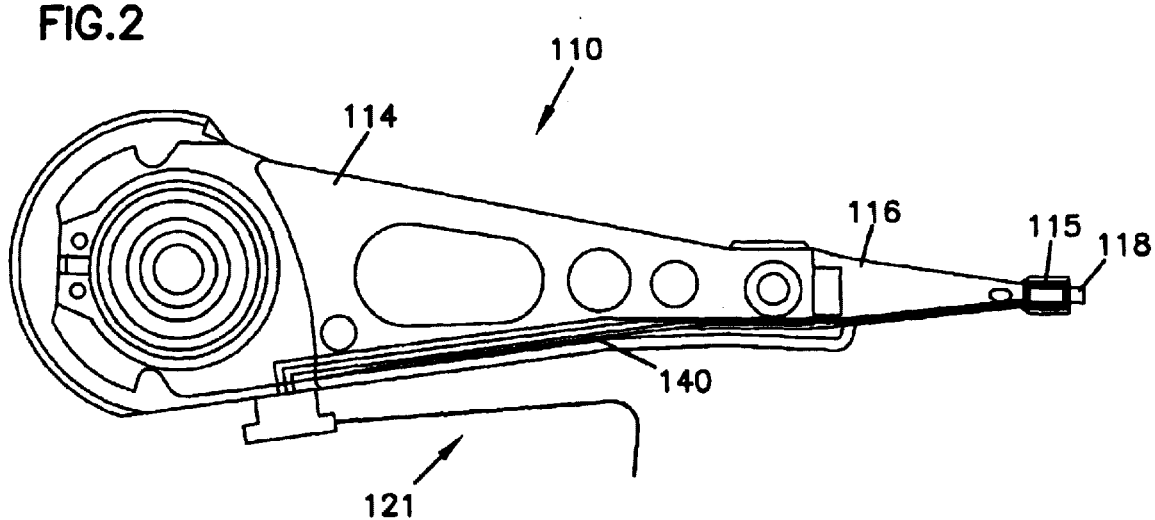
FIG. 2 is a top schematic of the actuator assembly from the disc drive of FIG. 1.

FIG. 2 is a top view of the actuator assembly 110. The actuator assembly 110 includes the actuator arm 114, the flexure 116, suspension 115, and the MR head 118 mounted on the suspension 115 at the distal end of the flexure 116. The actuator assembly 110 further includes MR connection circuitry 121 that interconnects the head 118 with the circuitry of the device in which the actuator assembly will be used, for example, a disc drive 110, or a media testing device (not shown). The connection circuitry 121 includes electrical connectors, as is generally known, such as electrical traces or lead wires 140, made of electrically conductive material, such as copper, or other such conductive material. The lead wires 140 run from the head 118, along the flexure 116 and the actuator arm 114, and thereafter off of the actuator arm 114, and are adapted for connection to the electrical circuitry of the disc drive 100, or other such device into which the actuator assembly 110 will be installed. The wires 140 are preferably affixed to the components of the actuator assembly 110 using techniques generally known in the art, for example, by the use of anchors or adhesives, and the like. The lead wires 140 can be held together by a tubular sheath, configured as a wire bundle, or arranged in another similar manner. Preferably, any portion of the lead wires 140 that extend off the actuator assembly 110 are held together by a sheath, or are incorporated into cable, such as a ribbon cable, flex cable, or other such structure. The lead wires 140 are electrically connected to various read/write components of the MR head 118. Preferably, the lead wires 140 are electrically connected to electrical contacts, for example, conductive reader pads on the MR head, as will be discussed in more detail below in reference to FIG. 3.

Figure 3:
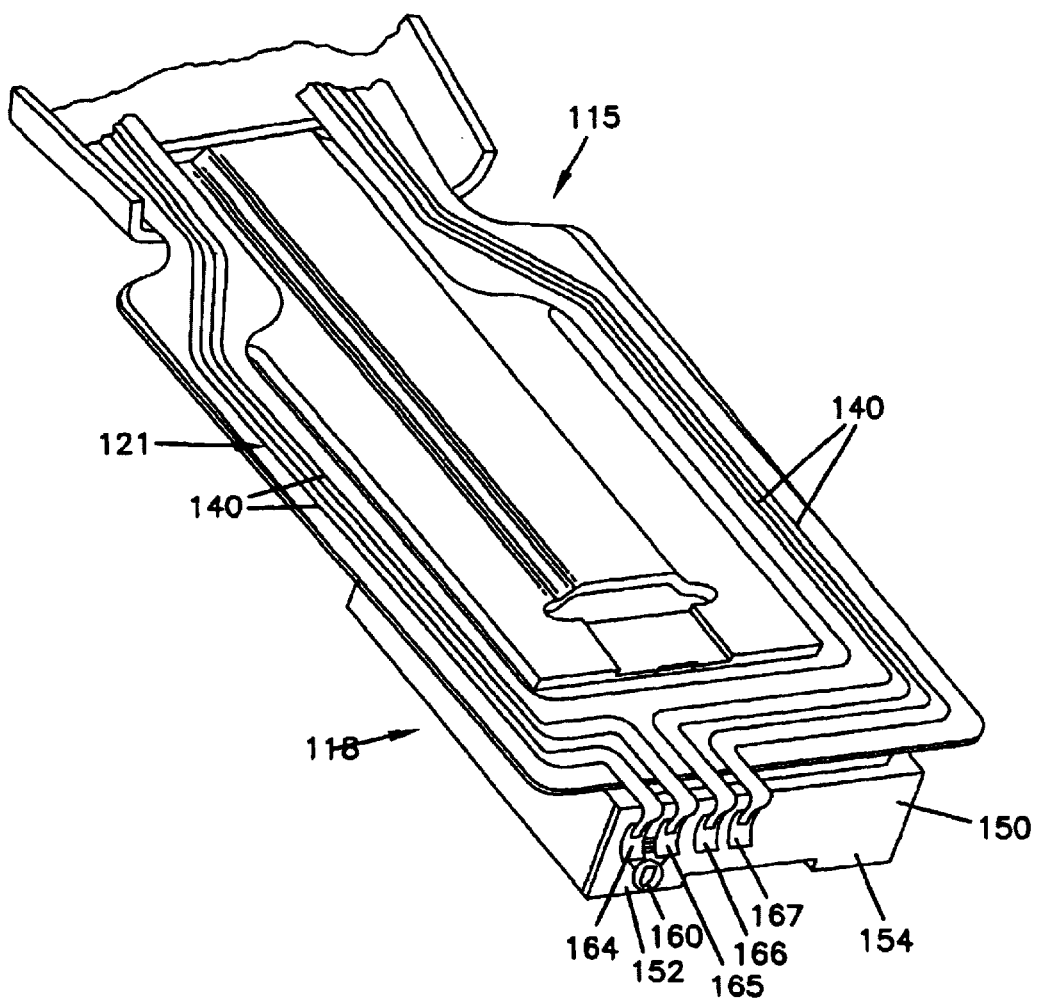
FIG. 3 is a partial perspective schematic of the magnetoresistive head assembly of the actuator assembly of FIG. 2, showing a shunting strap and a shunting structure.

Reference is now made to FIG. 3, which is a partial perspective view of the MR head 118 including an air bearing slider 150 mounted on the suspension 115. The structure of the slider 150 can be any of those conventionally known, and preferably includes a pair of self-acting hydrodynamic air bearing rails 152 and 154. The slider 150 is made of a substrate material as is conventionally known. Typically, the slider is made from a titanium carbide aluminum oxide composite material.

The slider 150 supports at least one MR sensor element or transducer 160, as is conventionally known. The sensor element 160 has a resistance that modulates in response to changing magnetic fields corresponding to magnetically encoded information upon an information storage disc, such as 108. The MR sensor element 160 is preferably located at the lower edge of the slider 150. In some embodiments, the head 118 also includes an additional element, for example a write element (not shown), mounted on the slider 150.

Figure 4:
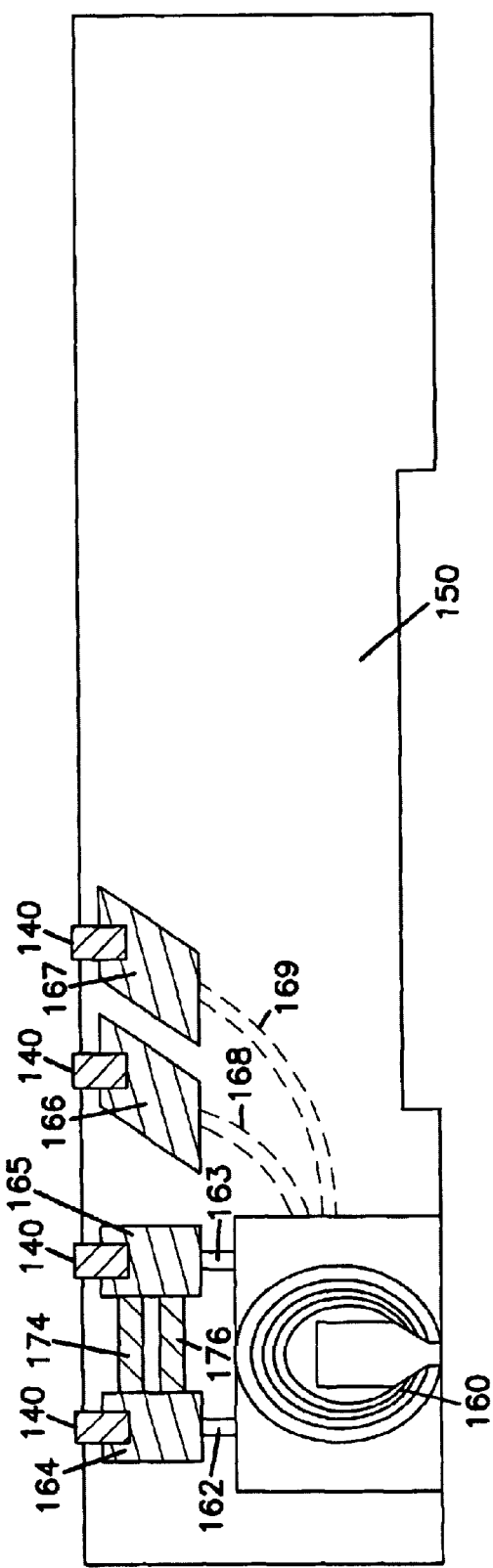
FIG. 4 is a rear schematic view of the slider assembly of the magnetoresistive head assembly in FIG. 3 showing a shunting strap and a shunting structure between reader pads.

Referring to both FIGS. 3 and 4, as discussed briefly above, the lead wires 140 are electrically connected to various read/write components of the head 118 through conductive pads 164, 165, 166, and 167 on the slider 150. The connection circuitry 121 includes MR head traces 162 and 163 that extend from the sensor element 160 to the reader pads 164 and 165, and thereby electrically connect the MR sensor element 160 to the rest of the connection circuitry 121. In the embodiment shown, the head 118 also includes additional conductive pads 166 and 167 that are connected to an additional element, for example a write element (not shown) via head traces 168 and 169.

Referring to back to FIGS. 2 and 3, the complete MR circuit runs from the circuitry of the disc drive 100, or other such structure, through a lead wires 140, through the reader pads 164 and 165, through the MR head traces 162 and 163, and through the MR sensor element 160.

The conductive pads 164, 165, 166, and 167 and the traces 162, 163, 168, and 169 are made of an electrically conductive material formed on the slider using deposition techniques as is conventionally known. Suitable materials for use as the conductive pads 164, 165, 166, and 167 and the traces 162, 163, 168, and 169 include, for example, gold, copper, silver, and other such conductive metals and metal alloys thereof, and mixtures thereof. In some embodiments, thin film seed layers are used in the deposition of the conductive pads 164, 165, 166, and 167 onto the slider substrate, as is conventionally known. The type of seed layer used will depend at least partially upon the material used for the reader pads, and the substrate onto which the material is being deposited. Those of skill in the art will recognize the appropriate deposition techniques and seed layers for use in depositing the particular type of material used as the conductive pads onto a particular type of substrate. In some embodiments, it is preferable to use gold conductive pads deposited on an alumina substrate using multiple thin film seed layers. For example, the multiple seed layers include a base layer of chromium on the alumina substrate, a layer of nickel/iron alloy over the chromium layer, and a layer of thin film gold over the chromium. The gold reader pad is then deposited over at least a portion of the layer of thin film gold. An example of such an embodiment is discussed in greater detail below in reference to FIGS. 6.

Figure 5:
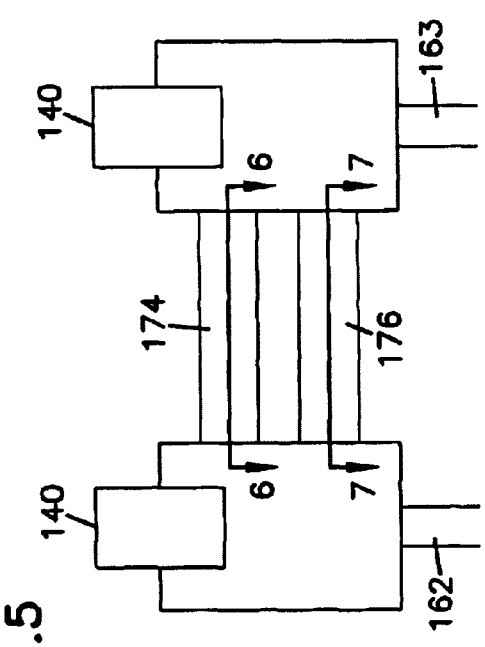
FIG. 5 is a schematic view the reader pads, the shunting strap and the shunting structure of the slider of FIG. 4.

As shown in FIGS. 4 and 5, as the head is initially processed, a conductive shunting strap 174 is provided that extends between, and is in electrical contact with two electrical contact points on each side of the connection circuitry 121, for example the reader pads 164 and 165. At least a portion of the shunting strap 174 includes a low resistance, conductive material that is in electrical contact with both of the reader pads 164 and 165, and acts to short circuit, or "shunt" the reader pads 164 and 165 together. The conductive material of the shunting strap 174 can be deposited as is conventionally known using appropriate techniques depending upon the type of material used. Examples of conductive material include conductive metals, for example gold, copper, silver, and the like, and alloys thereof, and mixtures thereof. Because the pads 164 and 165 are shorted together by the strap 174, a shorting path away from the MR element 160 is made. This shunting path runs through the reader pads 164 and 165, and through the conductive shunting strap 174. In this way, damaging electrical transient pulses will be shunted through the shunting strap 174 away from the MR element 160, and the MR element 160 is protected from electrical transients such as ESD. Those of skill in the art and others will understand that the shunting strap 174 can take the form and structure of a broad variety of conductive structures that extend between the reader pads 164 and 165 to short out the MR circuitry. Some particular structures of some embodiments of shunting straps are discussed in more detail below, with reference to FIGS. 6 and 8.

The shunting strap 174 is useful in shunting the MR circuit and protecting the MR element 160 during initial processing and handling of the head 118, but must be cut in order to operate the MR element 160, for example during testing of the head 118. After such testing or other types of operations, it is often desirable to re-shunt the MR circuit 121 prior to additional processing and final installation of the head 118. However, many shunts are difficult or complicated to install or reinstall on an operational head. Therefore, in accordance with one aspect of the invention, and referring to FIGS. 4 and 5, another shunting structure or "re-shunting" structure 176 is deposited during the initial processing along with the shunting strap 174. The shunting structure 176 as initially deposited does not act as a shunt to short the MR circuitry 121 away from the MR element 160, but allows for the optional shunting, or in some cases, re-shunting of the MR circuitry thereafter. It should be noted that the terms "re-shunting structure" is used because the shunting structure 176 can be used to re-shunt the MR element after an initial shunt, for example a shunting strap 174, has been removed or cut. However, those of skill in the art will recognize that the shunting structure 176 is not limited for use only to re-shunt a once shunted MR element.

Referring to FIG. 5, the shunting structure 176, is deposited on the slider 150, and extends between, and is in electrical contact with, two electrical contact points in the contact circuitry 121, for example the reader pads 164 and 165. Generally, the shunting structure 176 is unique in that when initially deposited it is a high resistance element between the reader pads 164 and 165, and does not act as a shunt between the reader pads 164 and 165. However, when desired, the shunting structure 176 can be heated to a predetermined temperature using techniques generally known, for example with a laser, at which point, and thereafter, the shunting structure 176 becomes low resistance, and acts as a conductive strap creating a conductive path between the reader pads 164 and 165. Thereafter, the shunting structure 176 acts to shunt the MR circuit 121 away from the MR element 160. The ability of the shunting structure 176 to be initially high resistance, and then become low resistance and conductive after it is heated is dictated by the physical arrangement of the shunting structure 176, the materials used in the shunting structure 176, or both, as will be discussed in greater detail below. One advantage of the shunting structure 176 is that it is already deposited on the head, and only needs to be heated to convert it into a working shunt.

Specific embodiments of preferred structure used as the shunting structure will be discussed in more detail below in reference to FIGS. 7 and 9. However, generally, the shunting structure 176 preferably includes a combination of at least one high resistance layer and at least one low resistance layer that are arranged appropriately to provide the desired high resistance properties as initially deposited, and low resistance properties after heating. Since the shunting structure is acting as a parallel circuit element to protect a thin film sensor element, the resistance of the shunt relative to that of the sensor is important. In some embodiments, it is preferred that the shunting structure in its high resistance state have a resistance of at least 100 times the resistance of the sensor, preferably at least 10,000 times the resistance of the sensor, more preferably at least $1 \times 10^6$ times the resistance of the sensor, especially at least $1 \times 10^8$ times the resistance of the sensor, and in its low resistance state, it is preferred that the resistance of the shunting structure be at most the resistance of the sensor, preferably at most one-tenth the resistance of the sensor, especially at most one-thousandth the resistance of the sensor. For example, for an MR head incorporating an MR element having a resistance of 50 $\Omega$, one preferred embodiment of the shunting structure would have a resistance of at least 5 M$\Omega$ in its high resistance state, and at most 5 $\Omega$ in its low resistance state. Some suitable examples of high conductivity materials for use in the low resistance layer include, for example, gold, aluminum, copper, silver, and the like. Suitable examples of low conductivity material for use in the high resistance layer include, for example, insulating or semiconducting materials, e.g., silicon (especially amorphous silicon), germanium, and the like. Preferably, the materials used in the high resistance and low resistance layers are compatible with each other such that they can mix to form an alloy, preferably a eutectic alloy, when heated. Preferably, the temperature at which the eutectic alloy solidifies is lower than either of the two melting points of the pure nonconductive and conductive materials. In at least some embodiments, the eutectic alloy preferably has a melting point of 400° C. or less. In one embodiment, the non-conductive material is silicon, and the conducting material is gold. Preferably, when heated the silicon and gold form a eutectic alloy having a melting point of approximately 363° C. Typically, each of the layers of the shunting structure 176 is deposited using deposition techniques conventionally known by those of skill in the art, for example, thin film deposition techniques. Seed layers, as discussed above with regard to the reader pads, can also be used for deposition of the shunting structure onto the substrate, as appropriate. Those of skill in the art and others will understand that the shunting structure 176 can take the form of a broad variety of structures that extend between the reader pads 164 and 165. Some particular embodiments of shunting structures 176 are discussed in more detail below, with reference to FIGS. 7 and 9.

Reference is now made to FIGS. 6 and 7, which show the particular structure of the shunting strap 174 and the shunting structure 176 of the embodiment shown in FIG. 5. FIG. 6 shows a partial cross-sectional view of the structure of the shunting strap 174 extending between reader pads 164 and 165 taken along lines 6—6 of FIG. 5. In this embodiment, a series of three thin-film seed layers are used for the deposition of reader pads 164 and 165 onto the substrate 180—a first seed layer 182, a second seed layer 183 and a third seed layer 184. As discussed above, the substrate 180, the pads 164 and 165, and the seed layers 182, 183, and 184 can be made of any material as would be determined to be appropriate by those of skill in the art. In this embodiment, preferably the reader pads 164 and 165 are gold, and the substrate 180 is alumina. The seed layers 182, 183, and 184, are of a material appropriate for the deposition of the material used as the reader pads 164 and 165. The third seed layer 184 is a thin film made of a conductive material, for example a conductive metal, for example gold, aluminum, copper, silver, and the like, and most preferably a gold thin film. The first seed layer 182 is preferably a chromium thin film, and the second seed layer 183 is preferably a nickel/iron alloy thin film. As will be understood by those of skill in the art, the seed layers can be of any thickness generally known to be useful in the particular application. In some embodiments, the first seed layer 182 is in the range of 100 to 500 Å thick, more preferably 200 Å thick, the second seed layer 183 is in the range of 100 to 600 Å thick, and preferably 300 Å thick, and the third seed layer 184 is in the range of 1800 to 2600 Å thick, and preferably 2200 Å thick. The shunting strap 174 is simply an extension of the three seed layers, including the conductive third seed layer 184, that extends between and is in electrical contact with both of the reader pads 164 and 165, thereby creating a shorting or shunting path.

FIG. 7 shows a partial cross sectional view of the shunting structure 176 along line 7—7 in FIG. 5. As discussed above, the reader pads 164 and 165 are deposited on the substrate 180 using seed layers 182, 183, and 184. The reader pads 164 and 165, substrate 180, and seed layers 182, 183, and 184 are made of the same materials as discussed above in reference to the shunting strap 174 in FIG. 6. However, a gap 185 is formed in the seed layers 182, 183 and 184, thereby not allowing for electrical connection between the reader pads 164 and 165 through the shunting structure 176 as initially deposited. The gap 185 is created by deposition and etching techniques conventionally known. A layer of low conductivity material 186 is deposited at least partially over the top surface of the third seed layer 184, and onto the surfaces of the gap 185. After deposition of the low conductivity layer 186, the gap 185 is preferably in the range of about 0.1 to 5 μm wide, more preferably 0.5 to 4 μm wide, and most preferably about 1 μm wide.

Therefore, the shunting structure 176 includes the combination of the layer of low conductivity material 186, preferably amorphous silicon, and the layer of high conductivity material 184, preferably gold, (the third seed layer) that are arranged appropriately to provide the desired high resistance properties as initially deposited, and low resistance properties after heated and melted together. More specifically, as deposited, the shunting structure 176 does not act as a shunt between the reader pads 164 and 165. The gap 185 and the low conductivity layer 186 form a high resistance path through the shunting structure 176 between the pads 164 and 164. However, when the shunting structure 176 is heated to melt the low conductivity layer 186 and high conductivity layer 184, the two layers mix to form a conductive alloy that flows to fill the gap 185. As the gap 185 is filled, and the alloy solidifies, and electrical connection through the shunting structure 176 between the reader pads 164 and 165 is thereby created. As such, after the shunting structure 176 is heated appropriately, the once high resistance structure 176 is now low resistance, and acts to shunt the MR circuitry 121.

One method of making the shunting strap 174 and shunting structure 176 in accordance with the embodiment shown in FIGS. 6 and 7 is set forth in the first working example provided below.

Figure 8:
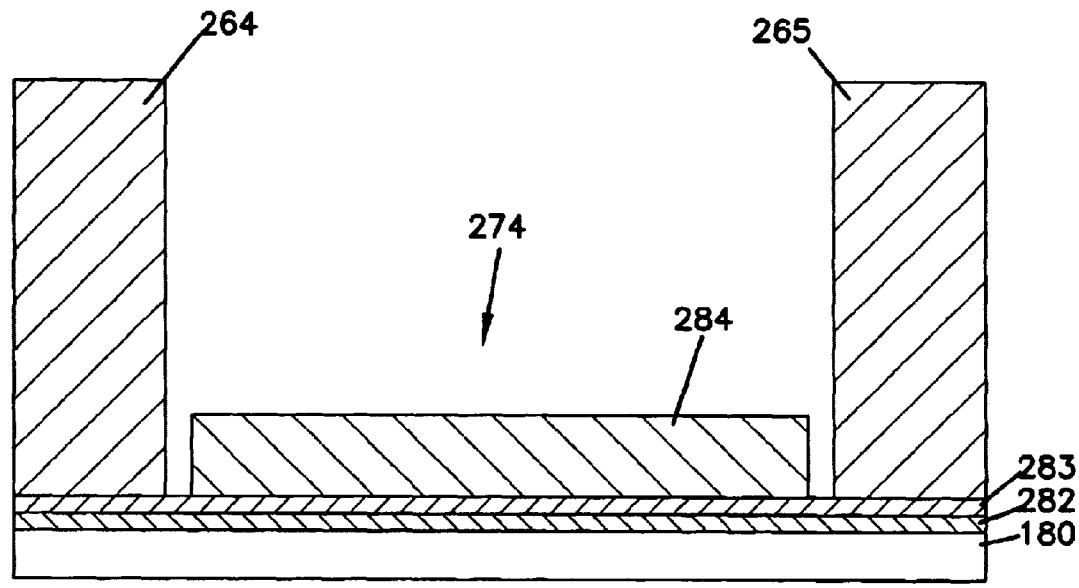
FIG. 8 is a sectional schematic like that of FIG. 6, but of an alternative embodiment of a shunting strap.
Figure 9:
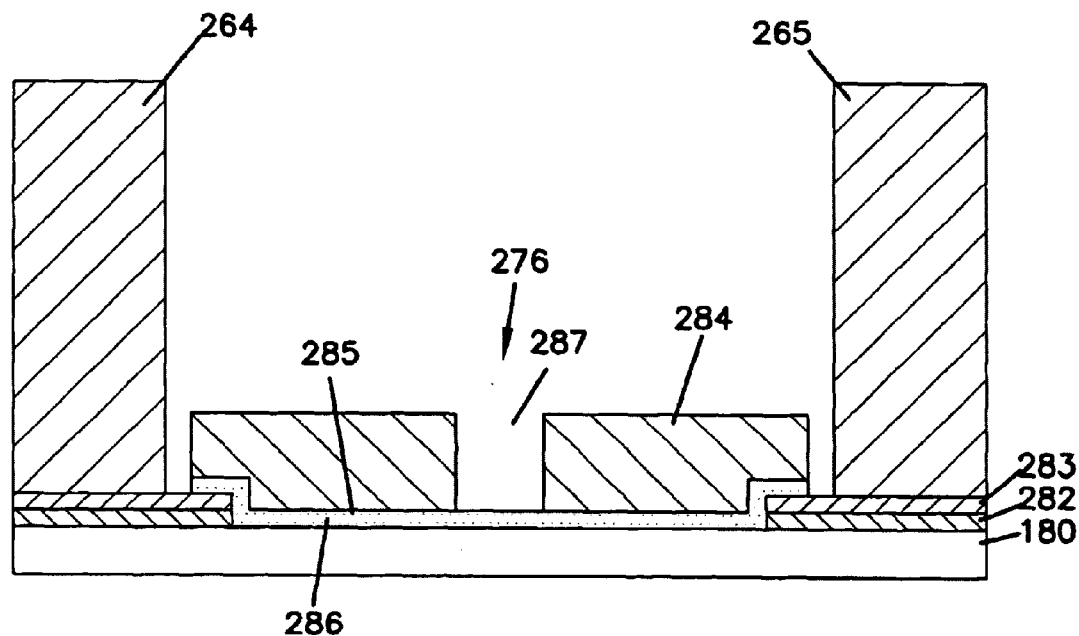
FIG. 9 is a sectional schematic like that of FIG. 7, but of an alternative embodiment of a shunting structure.

Reference is now made to FIGS. 8 and 9, which are cross-sectional views like those of FIGS. 6 and 7, but that show the structure of a shunting strap 274 and a shunting structure 276 of an alternative embodiment. FIG. 8 shows a partial cross-sectional view of the shunting strap 274 extending between reader pads 264 and 265. A series of two seed layers are used for the deposition of reader pads 264 and 265 onto the substrate 180—a first seed layer 282, and a second seed layer 283. As discussed above, the substrate 180 of the slider 150, the pads 264 and 265, and the seed layers 282, and 283 can be made of any material as would be determined to be appropriate by those of skill in the art. However, the seed layer 283 must be made of a conductive material in this embodiment. Preferably the reader pads 264 and 265 are gold, and the substrate 180 is alumina. The seed layers 282 and 283 are of a material appropriate for the deposition of the material used as the reader pads 264 and 265. The first seed layer 282 is preferably a chromium thin film, and the second seed layer 283 is preferably a nickel/iron alloy thin film. As will be understood by those of skill in the art, the seed layers can be of any thickness generally known to be useful in the particular application. In some embodiments, the first seed layer 282 is in the range of 100 to 500 Å thick, preferably 200 Å thick, and the second seed layer 283 is in the range of 100 to 600 Å thick, and preferably 300 Å thick. The shunting strap 274 further includes a conductive layer 284 that is preferably a thin film made of a conductive material, for example a conductive metal, for example gold, aluminum, copper, silver, and the like, and most preferably a gold thin film. The shunting strap 274 provides a low resistance pathway through the conductive layer 284 and the seed layers 283 that extends between and is in electrical contact with both of the reader pads 264 and 265, thereby shorting the pads 264 and 265 together.

FIG. 9 shows a partial cross sectional view of the shunting structure 276 of this embodiment. The reader pads 264 and 265 are deposited on the substrate using seed layers 282, and 283, as discussed above. The reader pads 264 and 265, substrate 180, and seed layers 282, and 283, are made of the same materials as discussed above in reference to the shunting strap in FIG. 8. However, in the shunting structure 276, there is a large gap 285 in the seed layers 282 and 283, and a layer of low conductivity material 286 is disposed onto the substrate surface in the gap 285 and extends at least partially over the top surface of the second seed layer 283 on either side of the gap 285. The conductive layer 284, preferably made of the same material as discussed above in relation to the shunting strap 274, is formed over the top of the low conductivity layer 286 and has a gap 287.

Therefore, the shunting structure 276 includes the combination of the layer of low conductivity material 286, preferably amorphous silicon, and the layer of conductive material 284, preferably gold, that are arranged appropriately to provide the desired high resistance properties as initially deposited, and low resistance properties after heated. More specifically, as deposited, the shunting structure 276 does not act as a shunt between the reader pads 264 and 265. The gap 285 and the low conductivity layer 286 form a high resistance path through the shunting structure 276 between the pads 264 and 264. However, when the shunting structure 276 is heated to melt the low conductivity layer 286 and conductive layer 284, the two layers 286 and 284 mix to form a conductive material. The conductive material makes contact with the conductive second seed layer 283, which is in turn in electrical contact with the reader pads 264 and 265. A low resistance path between the reader pads 264 and 265 is thereby created to act as a shunt.

One method of making the shunting strap 274 and shunting structure 276 in accordance with the embodiment shown in FIGS. 8 and 9 is described in the second working example provided below.

FIG. 10 is a flow diagram of one method of protecting a thin film sensor such as an MR element on an MR head from damaging electrical transients such as ESD in accordance with one embodiment of the invention. In operation 300, initial processing and manufacture of the thin film sensor and sensor assembly, such as an MR head having an MR element, takes place. In operation 302, a shunting strap and a shunting structure are deposited on the thin film sensor assembly between electrical contact points on the sensor circuit. The shunting strap acts to shunt the sensor circuit, and protect the sensor element or elements from damaging electrical transients such as ESD. The shunting structure is deposited such that it is high resistance, and does not act as a shunt. In operation 304, further processing and handling of the sensor assembly takes place, and the sensor elements on the assembly are protected from damaging electrical transients such as ESD by the shunting strap. In operation 306, the shunting strap is cut, for example with a laser, as is conventionally known and the sensor assembly is tested, or otherwise placed into operation. Because the shunting structure as initially deposited is high resistance, it does not interfere with the operation of the sensor element. In operation 308, the shunting structure is heat treated, for example with a laser, such that the shunting structure changes from a high resistance structure between the contact points on the sensor circuitry to a conductive structure, and therefore acts as a shunt. Because the shunting structure is now acting as a shunt, the sensor element is again protected from ESD during additional processing, handling, and installation procedures as shown generally in operation 309. Thereafter, in operation 310, the shunting structure is cut, for example using a laser, and the sensor assembly is placed into operation.

The heat treatment of the shunting structure (such as 176 or 276) to convert it from a high resistance structure to a low resistance conductive shunt in operation 304 can be performed by any method generally known and appropriate to the particular structure. Preferably, the shunting structure is heat-treated with radiation, e.g., a light source or a laser, that operates at an appropriate wavelength to interact with the materials used to construct the shunting structure. The power and pulse duration of the radiation burst (e.g., laser pulse) should be appropriate to impart enough heat to the shunting structure to provide the desired conversion of the structure from a high resistance to a low resistance structure, but complete cutting, damage, or destruction of the structure at this point in the processing should be avoided. Those of skill in the art will recognize that a broad variety of types of radiation sources (e.g., lasers), as well as power and pulse duration are contemplated, and can be used. In some embodiments, where the shunting structure is made from a bi-layer of gold and silicon, as in the specific embodiments discussed above, it is preferred to use green laser light operating at a wavelength of 532 nm, e.g., a frequency-doubled Nd:YAG laser. The laser power is preferably in the range of 1 to 4 watts, with a pulse duration in the range of 10 to 800 milliseconds. More preferably the power is in the range of 2 to 4 watts, with a pulse duration in the range of 20 to 500 milliseconds. More preferably the power is in the range of 3 to 4 watts, with a pulse duration in the range of 20 to 200 milliseconds. In one particular embodiment, a laser power of 3.25 watts with a pulse duration of 80 milliseconds was found to be preferable. The beam profile is appropriately sized for heat treatment using techniques generally known. In one embodiment, a cylindrical beam profile of 50 $\mu$m×250 $\mu$m is used for heat treatment, and achieved by using a 19.0 mm and 300.0 mm cylindrical lens system, and defocusing the 19.0 mm lens by about 325 $\mu$m.

The cutting of the shunting strap (such as 174 or 274) in operation 306, and the cutting of the shunting structure (such as 176 or 276) in operation 310, can be performed by any method generally known and appropriate to the particular structure. Preferably, the shunting strap and the shunting structure are cut with a radiation source, e.g., a light source or a laser, that operates at an appropriate wavelength, power level and pulse duration, depending upon the materials used to construct the shunt strap and shunt structure. The wavelength, power level and pulse duration used should be appropriate to cut the structures, but avoid excessive damage to the substrate or other components on the head. Those of skill in the art will recognize that a broad variety of wavelength, power level and pulse duration can be used. In some embodiments, the same radiation source that is used in the heat treatment step is also used in the cutting steps. In some embodiments, green laser light is used operating at a wavelength of 532 nm. The laser power is preferably in the range of 3.2 to 4.8 watts, with a pulse duration in the range of 10 to 1000 milliseconds. More preferably the power is in the range of 3.4 to 4.6 watts, with a pulse duration in the range of 20 to 800 milliseconds. The beam profile is appropriately sized for cutting the shunting strap and the shunting structure to prevent conductivity through the structures. In one embodiment, a cylindrical beam profile of 5 $\mu$m×250 $\mu$m is used. In another embodiment, a beam profile of 5 $\mu$m×250 $\mu$m is used. In these embodiments, the beam profiles are achieved by using a 19.0 mm and 300.0 mm cylindrical lens system, and defocusing the 19.0 mm lens as needed to achieve the desired profile.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art.

For example, it will be understood by those of skill in the art that although the shunting structure in the embodiment shown (such as 176 or 276) is used as a re-shunting apparatus after the shunting strap (such as 174 or 274) is cut for testing of the head, the shunting structure can be used is circumstances that do not include the use of an initial shunting strap. In essence, the shunting structure of the invention is not limited for use as a re-shunting structure, and can be used as an initial or primary shunting structure.

Additionally, those of skill in the art will recognize that it is not necessary to deposit the shunting apparatus between the reader pads to create a shunt to protect the MR circuitry. The shunting structure of the invention can be deposited or positioned to short the MR circuitry between any two contact points away from the MR element along the MR circuitry. For example, the shunting structure can be deposited between two contact points on the lead wires leading to and from the reader pads.

Furthermore, in the specific embodiments described above, the shunting structures were disposed between two reader pads to short a single MR element. However, those of skill in the art and others will understand that in other embodiments, the shunting structure could extend to additional pads. Additionally, more than one shunting structure can be used on a head to shunt additional pairs of pads.

Moreover, in some embodiments, it is contemplated that the shunting structure could include a single layer of conductive material, without a low conductivity layer, wherein the conductive layer includes a gap formed therein, which does not conduct electricity. When the conductive layer is melted, however, the conductive material flows to fill the gap, and thereby creates a conductive structure between the pads to act as a shunt. However, it has been found that it is preferable to include the low conductivity layer, such as an amorphous silicon layer, in conjunction with the conductive layer, such as a gold layer, because often, metals such as gold, when melted, have a tendency to ball-up, and therefore not wet or flow efficiently to fill the gap or otherwise provide for reliable electrical contact between contact points. On the other hand, the eutectic alloys, such as the gold/silicon alloy, tend to have less balling and better melting properties.

Many other such modifications, changes and alternatives are also contemplated, and will be apparent to those of skill in the art. Accordingly, all such modifications, changes and alternatives are encompassed in the spirit of the invention disclosed and as defined in the appended claims.

The invention will be further described by reference to the following detailed examples. These examples are not meant to limit the scope of the invention that has been set forth in the claims.

EXAMPLES

Examples 1

One embodiment of a MR head including a shunting strap and a shunting structure in accordance with the embodiments shown in FIGS. 6 and 7 were made using the following method:

The substrate made of titanium carbide aluminum oxide composite material is cleaned with a solvent. The Cr/NiFe/Au thin films were then deposited. 200 Å of Cr, 300 Å of NiFe, and 2200 Å of Au were deposited sequentially without breaking vacuum. A positive photoresist coating was then applied. (8 $\mu$m–12 $\mu$m of AZ4620 commercially available from Clariant). The solvent was driven off in 100° C. furnace for approximately 30 minutes. The photoresist was exposed with a mask that contained open area for plating of the thick Au bond pads. The photoresist was developed using AZ400K commercially available from Clariant. Thereafter, the resist was open frame exposed to facilitate photoresist removal once plating was completed. The resist was heated in 120° C. for 60 minutes to improve photoresist profile for plating. About 3–4-μm of Au was electroplated in the open areas for the Au bond pads. The photoresist was then stripped using AZ421K commercially available from Clariant. A positive photoresist was applied. (approximately 2.5-μm of AZ1518 commercially available from Clariant). The solvent was driven off in 100° C. furnace for approximately 30 minutes. The photoresist was exposed with a mask that contains open area in regions where etching was desired. The photoresist was then developed using AZ400K commercially available from Clariant. An Ar+ ion mill was used to etch 0.25 μm deep. This step defined the outline of the re-shunting tab structure. Following this step the re-shunting structure did not conduct. The resist was then removed with Acetone. A 450 Å a-Si thin film was deposited. The substrate was then coated with a positive photoresist (approximately 2.5 μm of AZ1518). The solvent was driven off in 100° C. furnace for approximately 30 min. The photoresist was exposed with a mask that contains open area in regions where etching is desired. The photoresist was then developed using AZ400K commercially available from Clariant. An Ar+ ion mill was used to etch 0.04 μm deep. The resist was then removed with Acetone.

Example 2

One embodiment of a MR head including a shunting strap and a shunting structure in accordance with the embodiments shown in FIGS. 8 and 9 was made using the following method:

The substrate made of titanium carbide aluminum oxide composite material is cleaned with a solvent. A layer of 300 Å Cr and a layer of 1500 Å NiFe were put down sequentially without breaking vacuum. A positive photoresist was applied. (8 μm–12-μm of AZ4620 commercially available from Clariant). The solvent was driven off in 100° C. furnace for approximately 30 minutes. The photoresist was then exposed with a mask that contained open area for plating of the thick Au bond pads. The photoresist was developed using AZ400K commercially available from Clariant. The resist was open frame exposed to facilitate photoresist removal once plating was completed. The resist was heated in 120° C. for 60 min to improve photoresist profile for plating. 3–4μm of Au was then electroplated in the open areas for Au bond pads. The photoresist was stripped using AZ421K commercially available from Clariant. A positive photoresist was then coated (approximately 2.5-μm of AZ1518 commercially available from Clariant). The solvent was driven off in 100° C. furnace for approximately 30 minutes. The resist was exposed with a mask that contains open area in regions where etching is desired. The photoresist was then developed using AZ400K commercially available from Clariant. An Ar+ ion mill was used to etch 0.25 μm deep. This step defined the outline of the re-shunting tab structure. Following this step the re-shunting tab structure would not conduct. The resist was removed with Acetone. A negative photoresist was applied. (approximately 2.5-μm of JSR NFR, available from JSR Microelectronics Inc). The solvent was driven off in 120° C. furnace for approximately 5 minutes. The resist was exposed with a mask that contains open area in regions where deposition is desired. The solvent was driven off in 120° C. furnace for approximately 3 minutes. The photoresist was then developed using AZ400K, available from Clariant. A 450 Åα-Si thin film was deposited. The resist was removed with Acetone. A negative photoresist was applied. (approximately 2.5-μm of JSR NFR, available from JSR Microelectronics Inc). The solvent was driven off in 120° C. furnace for approximately 5 minutes. The resist was exposed with a mask that contained open area in regions where deposition is desired. The solvent was driven off in 120° C. furnace for approximately 3 minutes. The photoresist was developed using AZ400K commercially available from Clariant. A 2200 Å Au thin film was deposited. Following this step the re-shunting structure did not conduct. The resist was removed with Acetone.

What is claimed is:

1. A method for electrically protecting a thin film sensor, the method comprising:

providing a thin film sensor assembly including the thin film sensor in electrical contact with a first and a second electrical contact;

depositing a shunting structure between and in electrical communication with the first and second electrical contacts such that the shunting structure as deposited is a high resistance path between the first and second electrical contacts;

heat-treating the shunting structure to form a low resistance path between the first and second electrical contacts to provide protection of the thin film sensor assembly from damaging electrical transients.

2. The method of claim 1, wherein the shunting structure is a multi-layer shunting structure including a high resistance layer and a low resistance layer, and when the shunting structure is heat treated, the high resistance layer and the low resistance layer mix to form a low resistance conductive alloy.

3. The method of claim 1, wherein the shunting structure as deposited comprises a conductive layer having a top surface and a first portion in contact with the first electrical contact, and a second portion in electrical contact with the second electrical contact, and a gap formed in the conductive layer between the first and second portions, such that when the shunting structure is heat treated, the conductive layer melts and fills the gap thereby creating a low resistance shunting path between the first and second electrical contacts to provide electrical protection to the thin film sensor assembly from damaging electrical transients.

4. The method of claim 3, wherein the shunting structure is a multi-layer shunting structure including the conductive layer, and a high resistance layer disposed in the gap and at least partially over the top surface of the conductive layer, such that when the shunting structure is heat treated, the high resistance layer and the conductive layer mix to form a conductive alloy that fills the gap thereby creating a low resistance shunting path between the first and second electrical contacts to provide electrostatic discharge protection to the thin film sensor assembly.

5. The method of claim 4, wherein the conductive layer comprises gold and the high resistance layer comprises silicon.

6. The method of claim 1, wherein the shunting structure as deposited comprises a high resistance layer in electrical contact with the first and second electrical contacts, and a conductive layer disposed on the high resistance layer and insulated from direct contact with the first and second electrical contacts by the high resistance layer, and wherein when the shunting structure is heat treated, the high resistance layer and the conductive layer mix to form a conductive alloy that is in electrical contact with the first and second electrical contacts.

7. The method of claim 1, wherein the shunting structure as deposited comprises a gold/silicon bi-layer, and wherein when the shunting structure is heat treated, the bi-layer mixes to form a gold/silicon eutectic alloy.

8. The method of claim 1, wherein the heat treatment step is performed using a radiation source.

9. The method of claim 1, wherein the thin film sensor assembly is a magnetoresistive head, and the thin film sensor is a magnetoresistive element.

10. The method of claim 9, wherein the magnetoresistive element is a giant magnetoresistive element.

11. An assembly for providing electrical protection to a thin film sensor, the assembly comprising:
   a thin film sensor assembly including the thin film sensor, and first and second electrical contacts in electrical communication with the sensor;
   a shunting structure deposited between and in electrical communication with the first and second electrical contacts, wherein the shunting structure as initially deposited is a high resistance path between the first and second electrical contacts and does not electrically short the first and second electrical contacts, and wherein, when the shunting structure is heat treated, the shunting structure thereafter becomes a low resistance path between the first and second electrical contacts to provide protection of the thin film sensor assembly from damaging electrical transients.

12. The assembly of claim 11, wherein the shunting structure is a multi-layer shunting structure including a high resistance layer and a conductive layer, and when the multi-layer shunting structure is heat treated, the high resistance layer and the conductive layer mix to form a low resistance conductive alloy.

13. The assembly of claim 11, wherein the shunting structure as deposited comprises a conductive layer having a top surface and a first portion in contact with the first electrical contact portion, and a second portion in electrical contact with the second electrical contact portion, and a gap formed in the conductive layer between the first and second portions, such that when the shunting structure is heat treated, the conductive layer melts and fills the gap thereby creating a low resistance shunting path between the first and second electrical contacts to provide electrostatic discharge protection to the thin film sensor.

14. The assembly of claim 13, wherein the shunting structure is a multi-layer shunting structure including the conductive layer, and a high resistance layer disposed in the gap and at least partially over the top surface of the conductive layer, such that when the shunting structure is heat treated, the high resistance layer and the conductive layer mix to form a low resistance conductive alloy that fills the gap thereby creating a low resistance shunting path between the first and second electrical contacts to provide electrostatic discharge protection to the thin film sensor.

15. The assembly of claim 14, wherein the conductive layer comprises gold and the high resistance layer comprises silicon.

16. The assembly of claim 11, wherein the shunting structure as deposited comprises a high resistance layer in electrical contact with the first and second electrical contacts, and a conductive layer disposed on the high resistance layer and insulated from direct contact with the first and second electrical contacts by the high resistance layer, and wherein when the shunting structure is heat treated, the high resistance layer and the conductive layer mix to form a low resistance conductive alloy that is in electrical contact with the first and second electrical contacts.

17. The assembly of claim 11, wherein the shunting structure as deposited comprises a gold/silicon bi-layer, and wherein when the shunting structure is heat treated, the bi-layer mixes to form a gold/silicon eutectic alloy.

18. The assembly of claim 11, wherein the thin film sensor assembly comprises a magnetoresistive head and the thin film sensor comprises a giant magnetoresistive element.

19. The assembly of claim 11, wherein the thin film sensor assembly comprises a magnetoresistive head and is mounted on an actuator assembly for use in a disc drive.

20. An apparatus for electrically protecting a thin film sensor, the apparatus comprising:
   a thin film sensor assembly including the thin film sensor and a first electrical contact and a second electrical contact, the first and second electrical contacts in electrical communication with the thin film sensor; and
   means for shunting the Thin film sensor to protect the thin film sensor from damaging electrical transients, the shunting means including a shunting structure deposited in electrical communication with the first and second electrical contacts, wherein the shunting structure is initially deposited as a high resistance path between the first and second electrical contacts and wherein the shunting structure becomes a low resistance path between the first and second electrical contacts upon heating of the shunting structure.

* * * * *

UNITED STATES PATENT AND TRADEMARK OFFICE
CERTIFICATE OF CORRECTION

PATENT NO. : 6,650,519 B1
DATED : November 18, 2003
INVENTOR(S) : Karr et al.

It is certified that error appears in the above-identified patent and that said Letters Patent is hereby corrected as shown below:

Column 16,
Line 37, "shunting the Thin film" should read -- shunting the thin film --

Signed and Sealed this

Twenty-fourth Day of February, 2004

JON W. DUDAS
*Acting Director of the United States Patent and Trademark Office*